(12) United States Patent
Bao

(10) Patent No.: US 10,988,199 B2
(45) Date of Patent: Apr. 27, 2021

(54) SAFE TWO-WHEELED SELF-BALANCING VEHICLE

(71) Applicant: Jiangsu Tallpic Intelligence Technology Ltd., Nanjing (CN)

(72) Inventor: Wei Bao, Nanjing (CN)

(73) Assignee: JIANGSU TALLPIC INTELLIGENCE TECHNOLOGY LTD., Nanjing (CN)

( * ) Notice: Subject to any disclaimer, the term of this patent is extended or adjusted under 35 U.S.C. 154(b) by 198 days.

(21) Appl. No.: 16/064,870

(22) PCT Filed: Dec. 15, 2016

(86) PCT No.: PCT/CN2016/110044
§ 371 (c)(1),
(2) Date: Jun. 21, 2018

(87) PCT Pub. No.: WO2017/107838
PCT Pub. Date: Jun. 29, 2017

(65) Prior Publication Data
US 2019/0009854 A1 Jan. 10, 2019

(30) Foreign Application Priority Data
Dec. 24, 2015 (CN) .......................... 201510993196.3

(51) Int. Cl.
*B62K 11/00* (2006.01)
*B62H 1/12* (2006.01)
(Continued)

(52) U.S. Cl.
CPC .............. *B62K 11/007* (2016.11); *B62H 1/12* (2013.01); *B62H 7/00* (2013.01); *B62J 1/00* (2013.01);
(Continued)

(58) Field of Classification Search
CPC .. B62D 37/00; B62D 51/02; B62J 1/00; B62J 45/00; B62J 45/20; B62J 99/00;
(Continued)

(56) References Cited

U.S. PATENT DOCUMENTS 4,186,934 A * 2/1980 Collings ................. B62H 1/12
280/221
6,302,230 B1 10/2001 Kamen et al.
(Continued)

FOREIGN PATENT DOCUMENTS

CN 102556258 A 7/2012
CN 104960607 A 10/2015
(Continued)

OTHER PUBLICATIONS

International Search Report; PCT/CN2016/110044; International Filing Date: Dec. 15, 2016.

*Primary Examiner* — Jacob D Knutson
*Assistant Examiner* — Felicia L. Brittman
(74) *Attorney, Agent, or Firm* — Schmeiser, Olsen & Watts, LLP

(57) ABSTRACT

A safe two-wheeled self-balancing vehicle includes two power wheels, a motion sensor, a control circuit, a chassis structure, a direction control input device, and a power source. The power wheels are installed at two sides of the chassis structure. The motion sensor is connected to the control circuit and fixed to the chassis structure opposite thereto. The direction control input device is connected to the control circuit. The control circuit drives the power wheels. A protection wheel support is disposed at a front side or both the front side and a rear side of the chassis structure. A floating protection wheel is installed at a front end of the protection wheel support. The protection wheel support is connected with the chassis structure or a structure of the protection wheel support, which enables the floating pro- (Continued)

tection wheel to move freely in a vertical direction with respect to the chassis structure.

9 Claims, 6 Drawing Sheets

(51) Int. Cl.
  *B62J 1/00* (2006.01)
  *B62J 99/00* (2020.01)
  *B62K 23/08* (2006.01)
  *B62L 3/04* (2006.01)
  *B62H 7/00* (2006.01)
  *B62J 45/00* (2020.01)
  *B62J 45/20* (2020.01)
(52) U.S. Cl.
  CPC ............... *B62J 99/00* (2013.01); *B62J 45/00* (2020.02); *B62J 45/20* (2020.02); *B62K 23/08* (2013.01); *B62L 3/04* (2013.01)

(58) Field of Classification Search
  CPC ......... B62K 11/007; B62K 23/08; B62L 3/04; B62H 1/12; B62H 7/00
  USPC ......................................................... 180/6.2
  See application file for complete search history.

(56) References Cited

U.S. PATENT DOCUMENTS

| 6,408,230 B2* | 6/2002 | Wada | G05D 1/0272 |
| | | | 180/252 |
| 2002/0148663 A1 | 10/2002 | Chang | |
| 2010/0176574 A1* | 7/2010 | Pollice | B62B 3/02 |
| | | | 280/401 |

FOREIGN PATENT DOCUMENTS

| CN | 204895700 U | 12/2015 |
| CN | 105539658 A | 5/2016 |
| TW | 201438953 A | 10/2014 |

* cited by examiner

SAFE TWO-WHEELED SELF-BALANCING VEHICLE

CROSS-REFERENCE TO RELATED APPLICATIONS

This application claims priority to PCT Application No. PCT/CN2016/110044, having a filing date of Dec. 15, 2016, based on CN 201510993196.3, having a filing date of Dec. 24, 2015, the entire contents both of which are hereby incorporated by reference.

FIELD OF TECHNOLOGY

The following relates to an electric vehicle, and in particular, to a two-wheeled self-balancing vehicle having dynamically controlled floating safety protection wheels.

BACKGROUND

Two-wheeled self-balancing vehicles using the inverted pendulum control principle have been widely used. The original representative product of this vehicle is Segway, and the technical solution is disclosed by U.S. Pat. No. 6,302,230. Because it requires only two power and support wheels, this vehicle has the advantages of flexible operation and small structure and volume. Due to safety problems, this vehicle actually cannot become a means of transportation. Judging from a large number of actual use experiences, the current out-of-control situations of the two-wheeled self-balancing vehicle are mainly falling forward and backward, especially falling forward, such as sudden falling caused by insufficient power during obstacle climb-over, insufficient maintaining power at a high speed and during uphill driving, and sudden system crashes, and final tumble caused by large-amplitude swinging due to the intrinsic attribute of a control system during barrier breakthrough, crash-stop, or application of an external force. These situations are usually very dangerous and a driver completely fails to control.

Chinese invention patent application publication No. CN104960607A, "Novel Free Sensor Controlled Vehicle" discloses a scheme of adding an auxiliary wheel. The auxiliary wheel and the auxiliary wheel bending arm are installed at the front side of the main body of the vehicle, and when a risk of tumbling occurs, the auxiliary wheel bending arm extends out forwards, so as to attempt to stabilize the vehicle body. The main disadvantage of this scheme include: 1, the auxiliary wheel is usually too late to extend out at the tumbling moment of the vehicle body; 2, when the vehicle body is inclined or going uphill or there is an obstacle, the auxiliary arm bending arm cannot extend out when blocked by the ground; and 3, when the vehicle goes downhill, the auxiliary wheel loses function.

There is also a scheme of fixedly installing an auxiliary wheel. However, this scheme actually changes the self-balancing control state. Even if it is possible to drive on a flat road, there will be control problems when going uphill and downhill or facing an obstacle.

SUMMARY

An aspect relates to a safe two-wheeled self-balancing vehicle. The two-wheeled self-balancing vehicle has controllable protection wheels. When being driven normally, the two-wheeled self-balancing vehicle can move in the up-down direction and be in contact with or close to the ground without any force to the vehicle frame. In the event of an emergency brake or a danger resulting from loss of control of the vehicle, the protection wheel (support) can be driven by a force from a rider or electricity to be fixed with respect to the vehicle frame, thereby providing protection quickly.

Technical Solution a safe two-wheeled self-balancing vehicle, comprising two power wheels, a motion sensor, a control circuit, a chassis structure, a direction control input device, and a power source; the power wheels are installed at two sides of the chassis structure; the motion sensor is connected to the control circuit and fixed to the chassis structure opposite thereto; the direction control input device is connected to the control circuit, and the control circuit drives the power wheels; characterized in that: a protection wheel support is disposed at the front side of the chassis structure, or both the front side and the rear side of the chassis structure; a floating protection wheel is installed at the front end of the protection wheel support; the manner in which the protection wheel support is connected with the chassis structure or a structure of the protection wheel support itself enables the floating protection wheel to move freely in a vertical direction with respect to the chassis structure; a locking device is connected to the chassis structure and the protection wheel support; when the locking device is in a locked state, the floating protection wheel is in a location where it is fixed to the chassis structure; and when the locking device is released, the floating protection wheel moves freely in the up-down direction.

In the safe two-wheeled self-balancing vehicle of embodiments of the present invention, the floating protection wheel is in an up-down free movement state and naturally falls down during normal driving. Therefore, regardless of going uphill and downhill or encountering obstacles, the balance of the vehicle body will not be affected. When an abnormal situation occurs, such as stalling, slipping, power failure, over-current, and over-inclination of the vehicle body, the up-down movement of the floating protection wheel can be prevented by the locking device. That is, the upper and lower locations of the floating protection wheel are fixed relative to the chassis structure of the vehicle, so as to achieve the stable state of multi-wheel support, thereby avoiding the risk of tumbling. Because the floating protection wheel will always come into contact with the ground under the effect of its own weight, the protection wheel can play a supporting role very quickly, even if in a downhill situation. In addition, by using the solution of embodiments of the present invention, in the case of emergency braking, the following method can be used to make the braking process more rapid and reliable: the front protection wheel support is locked, and then the gravity center of the load is moved backward to cause the vehicle body to lean backward. Due to the support of the protection wheel, backward movement of the gravity center does not need to be delayed, so as to enter a deceleration process quickly. However, the braking process of the two-wheeled self-balancing vehicle in the known art includes pushing the vehicle body (chassis) to lean forward, and the acceleration of the forward movement of the wheel causes the gravity center of the load (body's gravity center) to relatively move backwards, causing the vehicle body to lean backward and thus decelerating. This process requires a certain period of time, especially loss of control may occur when there is insufficient power and when the road is uneven. Therefore, the safe two-wheeled self-balancing vehicle of embodiments of the present invention has the characteristics of flexibility, compactness, and high efficiency of the existing two-wheeled self-balancing vehicle, and also has the safety and reliability of three-wheeled or four-wheeled vehicles.

The locking of the floating protection wheel can be manually implemented by a driver human by using a mechanical brake control device. It is connected to the locking device by using a mechanical mechanism, thereby controlling the floating protection wheel to freely move up or down or to be at a fixed location relative to the chassis structure. For example, the locking device is connected by using a brake mechanism similar to that of a bicycle or a motorcycle. The advantage of manually implementing locking is that safety can be ensured in the event of an electronic system malfunction.

To implement rapid control and coordination with the overall control system of the vehicle, locking and release of the locking device may be controlled by an electrically controlled execution mechanism, and when it is locked, the location of the floating protection wheel is fixed relative to the chassis structure, and when it is released, the floating protection wheel can freely move up and down. The execution mechanism is connected to and controlled by the control circuit.

As a further improvement, to improve the safety and maneuverability, a cockpit in which a driver sits may further be introduced. The cockpit is slidably or rotatably installed on the chassis structure in front and rear directions. A motor-driven mechanism is provided between the cockpit and the chassis to control front and rear rotation or sliding of the cockpit, so as to change front and rear locations of a gravity center thereof, and the motor is driven by the control circuit. A speed control input device and a brake control input device are further included, and are both connected to the control circuit. The control circuit can quickly adjust the gravity center of the cockpit and the locking/release state of the floating wheel support according to the vehicle's balance state and the driver's control intention, thereby achieving smoother, faster, and safer control without requiring the driver to always participate in the balance control. So it is also more comfortable.

As a further improvement, the floating protection wheel is connected with a direction steering engine, and the control circuit controls the direction of the floating protection wheel by using the direction steering engine, so that the rolling direction of the floating protection wheel is consistent with the actual movement direction thereof. This can avoid lateral resistance and wear of the floating protection wheel.

BRIEF DESCRIPTION

Some of the embodiments will be described in detail, with reference to the following figures, wherein like designations denote like members, wherein:

FIG. 1 is a schematic diagram of a two-wheeled self-balancing vehicle driven in a standing manner according to Embodiment 1 of the present invention; and In the figure, 1 is a chassis structure; 2 is a power wheel; 3 is a protection wheel support at a front side; 31 is a slide rod of a protection wheel support; 4 is a protection wheel; 41 is a protection wheel support; 5 is a locking device; 6 is a handle; and 7 is a brake handle.

FIG. 2 is a structurally schematic diagram of a locking device according to Embodiment 1 of the present invention.

In the figure, 31 is a slide rod of a protection wheel support; 5 is a locking device; 53 is a first friction plate 54 is a second friction plate; and 8 is an electrically controlled locking execution device.

FIG. 3 is a schematic diagram of a two-wheeled self-balancing vehicle with a slidable cockpit according to Embodiment 2 of the present invention;

In the figure, 1 is a chassis structure; 11 is a slide rail of a cockpit; 2 is a power wheel; 3 is a protection wheel support at a front side; 33 is a tooth plate of a protection wheel support; 4 is a protection wheel; 42 is a direction steering engine of a protection wheel; 51 is a locking motor; 52 is a clip; 9 is a cockpit; 91 is a seat; 92 is a pedal; 93 is a speed input device; and 10 is a cockpit drive motor.

FIG. 4 is a schematic diagram of a release state of a locking mechanism of a protection wheel support according to Embodiment 2 of the present invention;

In the figure, 33 is a tooth plate of a protection wheel support; 51 is a locking motor; and 52 is a clip.

In the figure, 9 is a cockpit; 901 is a rotation shaft of the cockpit; 3 is a protection wheel support at a front side; and 301 is a protection wheel support at a rear side.

DETAILED DESCRIPTION

The embodiments are further described in detail below with reference to the accompanying drawings and specific embodiments.

Embodiment 1

Figure 1:
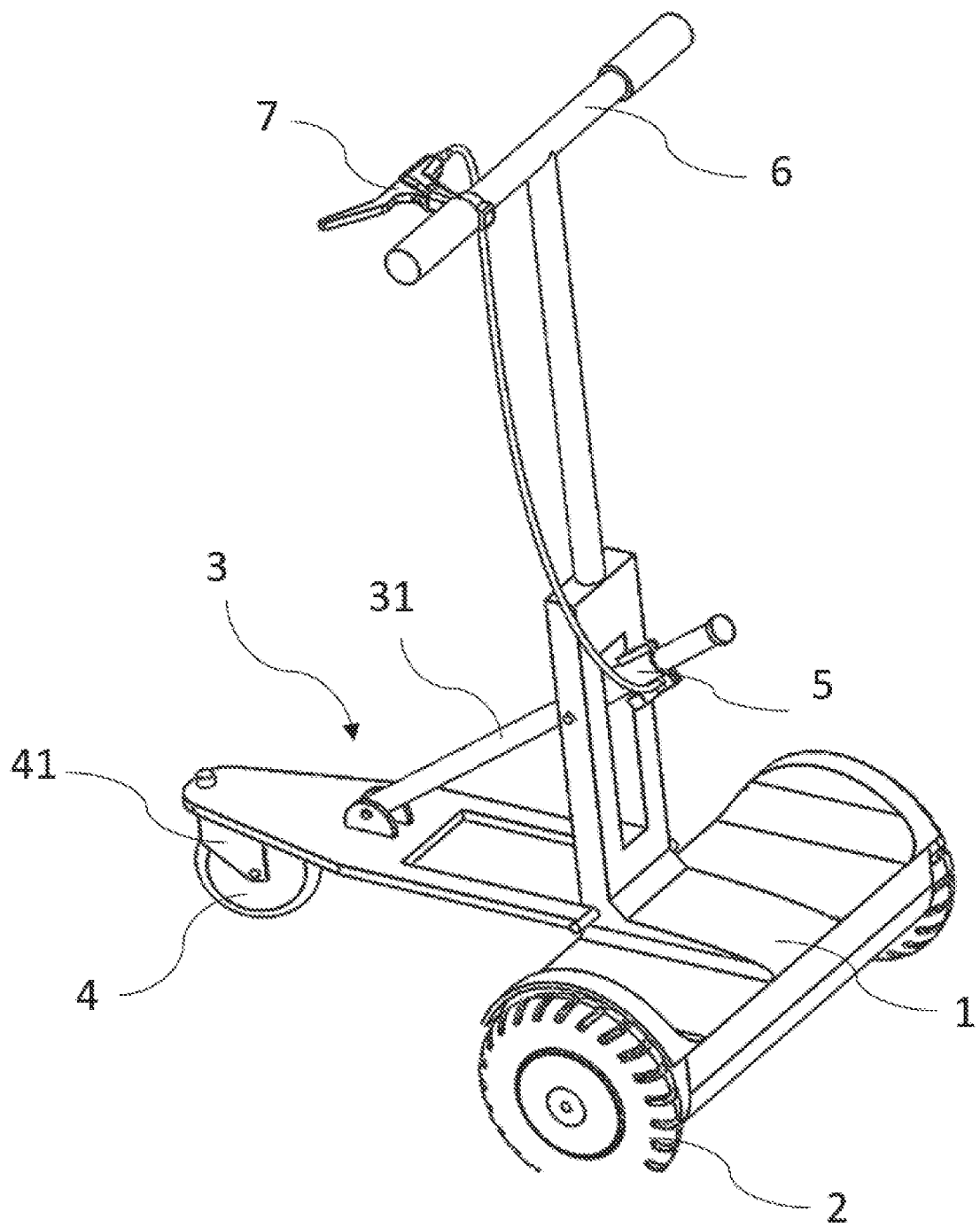
Figure 2:
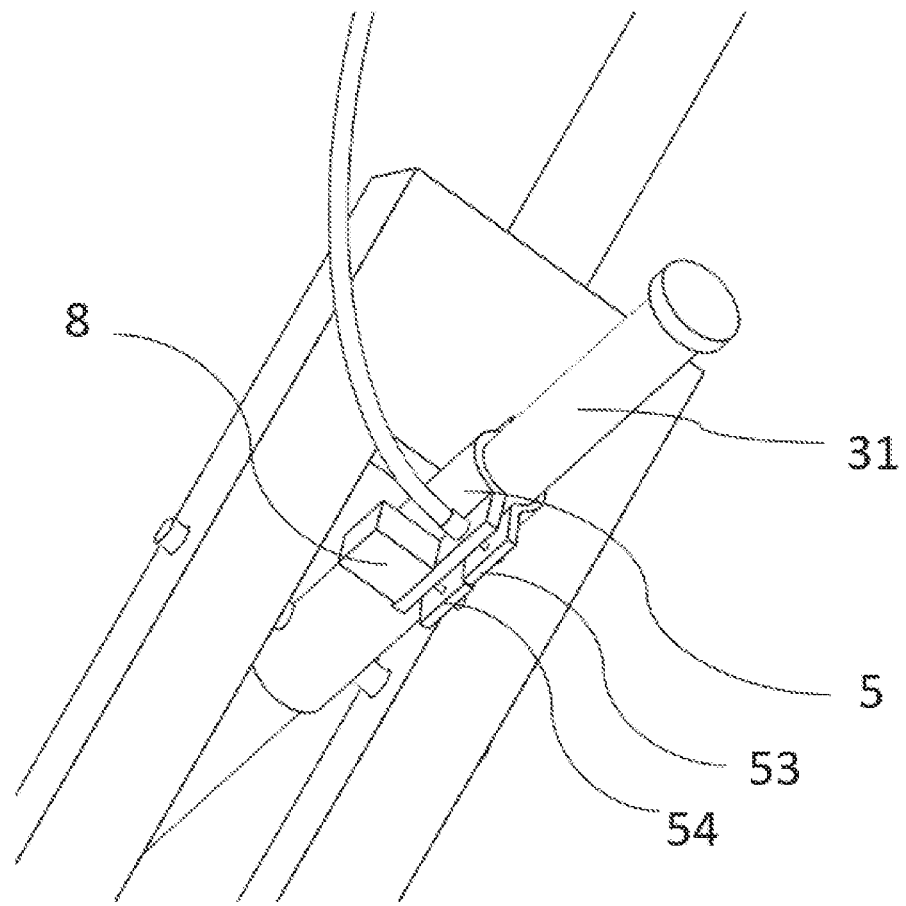

This embodiment is a two-wheeled self-balancing vehicle driven in a standing manner. As shown in FIG. 1 and FIG. 2, FIG. 1 is a schematic diagram of the two-wheeled self-balancing vehicle driven in a standing manner according to this embodiment; and FIG. 2 is a structurally schematic diagram of a locking device according to this embodiment. The main body is constituted by a typical two-wheeled self-balancing vehicle, including two power wheels 2, a motion sensor, a control circuit, a chassis structure 1, a direction control input device, a power source, etc., and the like. The power wheels 2 are installed on both sides of the chassis structure 1. The motion sensor is connected to the control circuit and is fixed relative to the chassis structure 1. Usually, an MEMS sensor is soldered to a PCB while the PCB is fixed to the chassis structure 1. The direction control input device is connected with the control circuit and the control circuit drives the power wheels. The operation of the vehicle is determined by the movement of the gravity center of the driver's body and the direction control input. Different from the prior art, a protection wheel support 3 at a front side is disposed at the front side of the vehicle and is rotatably connected to the chassis structure 1 in an up-down direction. A protection wheel 4 is installed on its front side, and the protection wheel 4 is installed on the front end of the protection wheel support 3 at a front side by using a protection wheel support 41 As a part of the protection wheel support, a slide rod 31 of the protection wheel support is rotatably connected to the main body of the protection wheel support and passes through the locking device 5. A part of the locking device 5 is tubular and is rotatably fixed to the upper part of the chassis structure. The other part is two pieces of friction plates. The first friction plate 53 is connected to the brake handle by using a brake wire, and the other second friction plate 54 is connected to the electrically controlled locking execution device 8, which has a control circuit for control. In this embodiment, the circular standpipe on the lower part of the handle 6 can be rotated left and right to control the operation direction. The slide bar 31 of the protection wheel support is a metal pipe. During normal driving, the two friction plates are both at released locations. The slide bar 31 of the protection wheel support can slide freely inside the locking device 5, so that the protection wheel 4 can freely move up and down with respect to the chassis structure of the vehicle. The protection wheel 4 will always come into contact with the ground under the effect of its own gravity, and the acting force on the vehicle body can be ignored, and therefore thee self-balancing driving operation is not affected. When the control circuit detects an abnormal situation, such as wheel stalling, wheel slipping, battery over-current, over-inclination of the vehicle body, and the like, the second friction plate 54 may be tightened by the electronically controlled locking execution device 8, to make the slide rod 31 of the protection wheel support unable to slide, so that the location of the protection wheel 4 is locked, and the protection wheel and the two power wheels form a triangular support body, which can prevent the vehicle and the driver from tumbling forward. As a further protection, the driver can also pull the brake handle 7 when judging that there is a risk of tumbling, and the first friction plate 53 is tightened by using the brake wire, and the function of locking the protection wheel is also implemented. Another advantage of this embodiment is that, during the braking, the protection wheel support may be locked first, and then the gravity center quickly moves backward under the support of the protection wheel 4, so that the balance control automatically enters the deceleration process. Upon comparison, the self-balancing vehicle in the known art needs to have a process of making the vehicle body (chassis structure) lean forward and making the power wheels accelerate in forward movement before entering the deceleration process, and therefore braking is necessarily delayed. As a simplified and feasible design, the protection wheel support 41 of the protection wheel 4 uses an eccentric wheel support shaft, so that the direction of the protection wheel automatically conforms with the operation direction thereof during operation.

Embodiment 2

Figure 3:
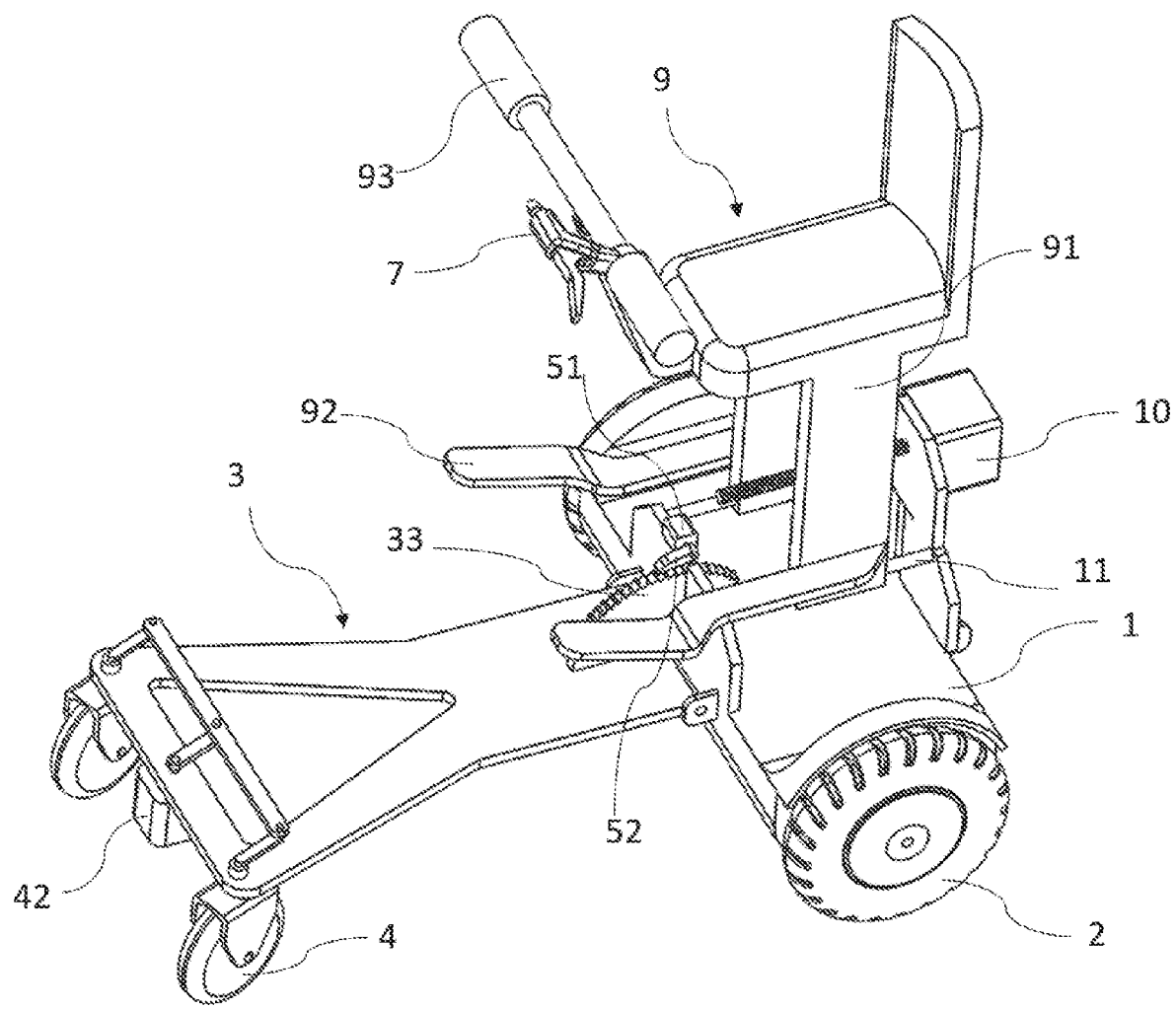
Figure 4:
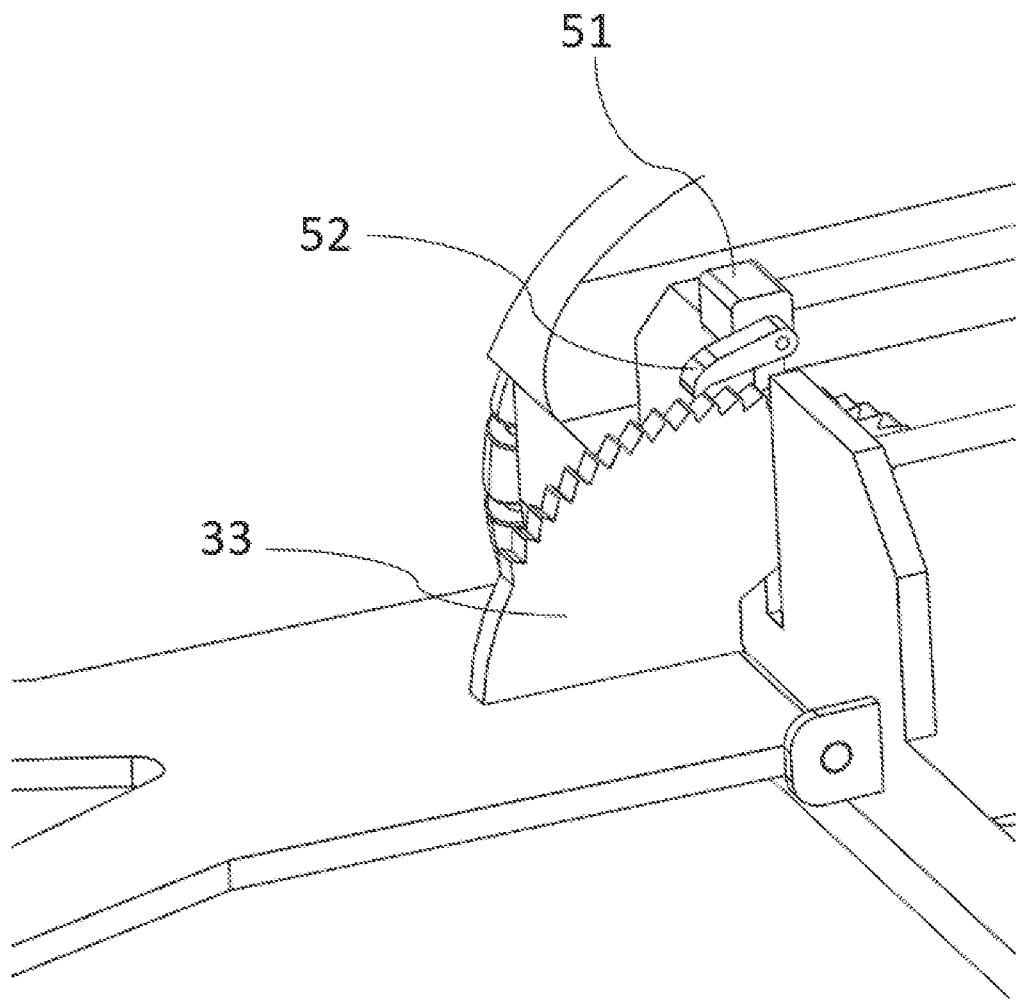
Figure 5:
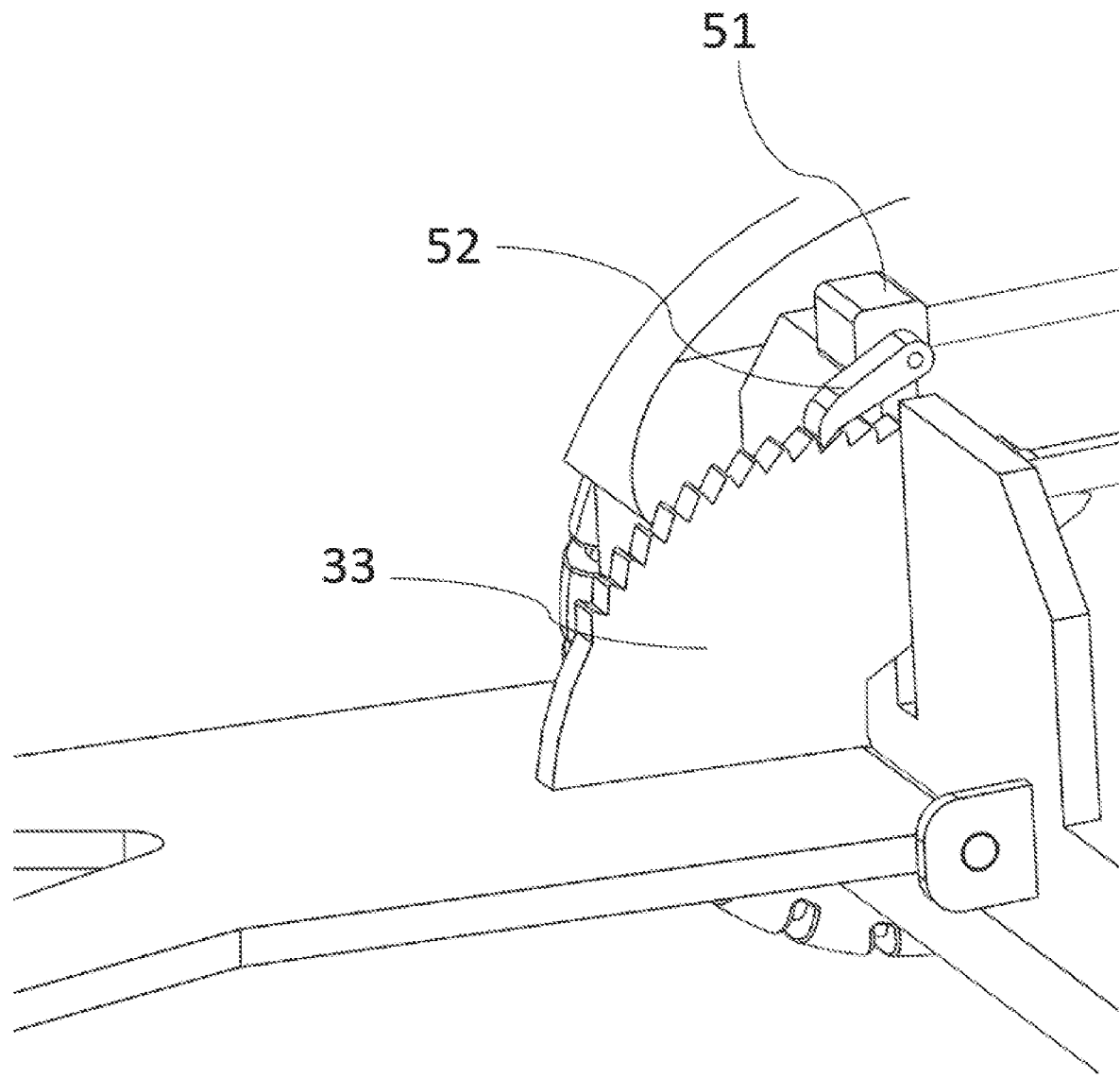
FIG. 5 is a schematic diagram of a locking state of a locking mechanism of a protection wheel support according to Embodiment 2 of the present invention; and In the figure, 33 is a tooth plate of a protection wheel support; 51 is a locking motor; and 52 is a clip.

This embodiment is a two-wheeled self-balancing vehicle having a cockpit that can slide in front and rear directions. As shown in FIG. 3, FIG. 3 is a schematic diagram of a two-wheeled self-balancing vehicle with a slidable cockpit according to this embodiment. In this embodiment, a cockpit 9 is added above the chassis structure 1, and the cockpit 9 is connected to the chassis structure 1 by using the slide rail 11 of the cockpit on the chassis structure 1. By using a screw connected to the cockpit drive motor 10, the control circuit can control front and rear locations of the cockpit 9, thereby changing the gravity center of the load. There is a seat 91, a pedal 92, and the like on the cockpit for easy ride by a driver. A speed input device 93 connects the control signal to the control circuit by using the handle. In this embodiment, the protection wheel support is also disposed only in a front part of the vehicle, and the locking device consists of or includes the locking motor 51 and the clip 52. The locking motor 51 is fixed to the chassis structure 1. The forward and reverse rotation of the locking motor 51 determine the locking and release of the protection wheel support. In the locked state, a tooth plate 33 of the protection wheel support on the protection wheel support is limited due to the acting force of the clip 52. FIG. 4 and FIG. 5 show the locations of the clip 52 in the released and locked states, respectively. In order to increase the lateral stability, two protection wheels 4 are disposed on the left and right, and the direction of the protection wheel is controlled by the direction steering engine 42 of the protection wheel. The introduction of the direction steering engine 42 of the protection wheel can prevent the protection wheel 4 from swinging during driving, reduce energy loss and wheel wear, and increase driving stability. The brake handle 7 is provided for the driver to actively and directly control the brake to improve safety. On one hand, the brake handle 7 can be connected to the control circuit. On the other hand, the brake handle 7 can mechanically lock the protection wheel support and brake the power wheel. In the figure, the shape of the tooth of the tooth plate 33 of the protection wheel support and the shape of the head of the clip 52 are close to a triangle to emphasize the force of support protection. In fact, the related shape may also be trapezoidal or rectangular, so that locking is powerful in both directions. The locking device can also be implemented in various ways, for example referring to various existing power clutch devices.

As an optimization, an acceleration control input device and a brake control input device may employ an accelerator pedal (speed pedal) and brake pedal structure similar to that of an automobile, thereby facilitating the direction control operation of the hand. The brake pedal may be installed on the bottom of the cockpit, or on the chassis structure. The advantage of being installed on the chassis structure is that the cockpit can be pushed backwards by means of human power. The state signals of the speed pedal and the brake pedal are connected to the control circuit.

The operation process is as follows: in the parking state, the protection wheel support is locked, and the gravity center of the cockpit moves forward to a location between the power wheel and the protection wheel, and the vehicle is in a stable posture with four-wheel support. During start-up, the posture is kept for acceleration; after a particular speed is reached, the gravity center of the cockpit moves backwards until a supporting force of the protection wheel support for the chassis structure is approximately zero; in this case, the locking device is released to enable the protection wheel into a free floating state, and self-balancing control is synchronously started. Acceleration, smooth operation and deceleration are implemented by changing the location of the gravity center of the cockpit. During parking, first deceleration is performed, then the protection wheel support is locked, the gravity center of the cockpit moves forward, the four-wheel support state is entered, and parking is performed.

As an improvement, in order to cooperate with monitoring of the supporting force of the protection wheel support for the chassis structure, a sensor such as a strain gauge, a Hall displacement sensor, and a micro switch device is installed at an appropriate location of the protection wheel support or the locking device or the chassis structure. In fact, any type of sensor and installation method is suitable as long as it can detect the supporting force of the protection wheel support for the chassis structure or at least detect the appearance and disappearance of such support force. Under the current technical conditions, a person of ordinary skill in the art can design a variety of different implementations to achieve the above objective.

The two-wheeled self-balancing vehicle with a cockpit that can slide in front and rear directions in this embodiment not only possesses the characteristic of flexibility of the two-wheeled self-balancing vehicle, such as in-place turnaround, but also has the same stability as the four-wheeled vehicle, and has a small occupation size on a road surface, especially when the protection wheel support can be folded and contracted.

Embodiment 3

Figure 6:
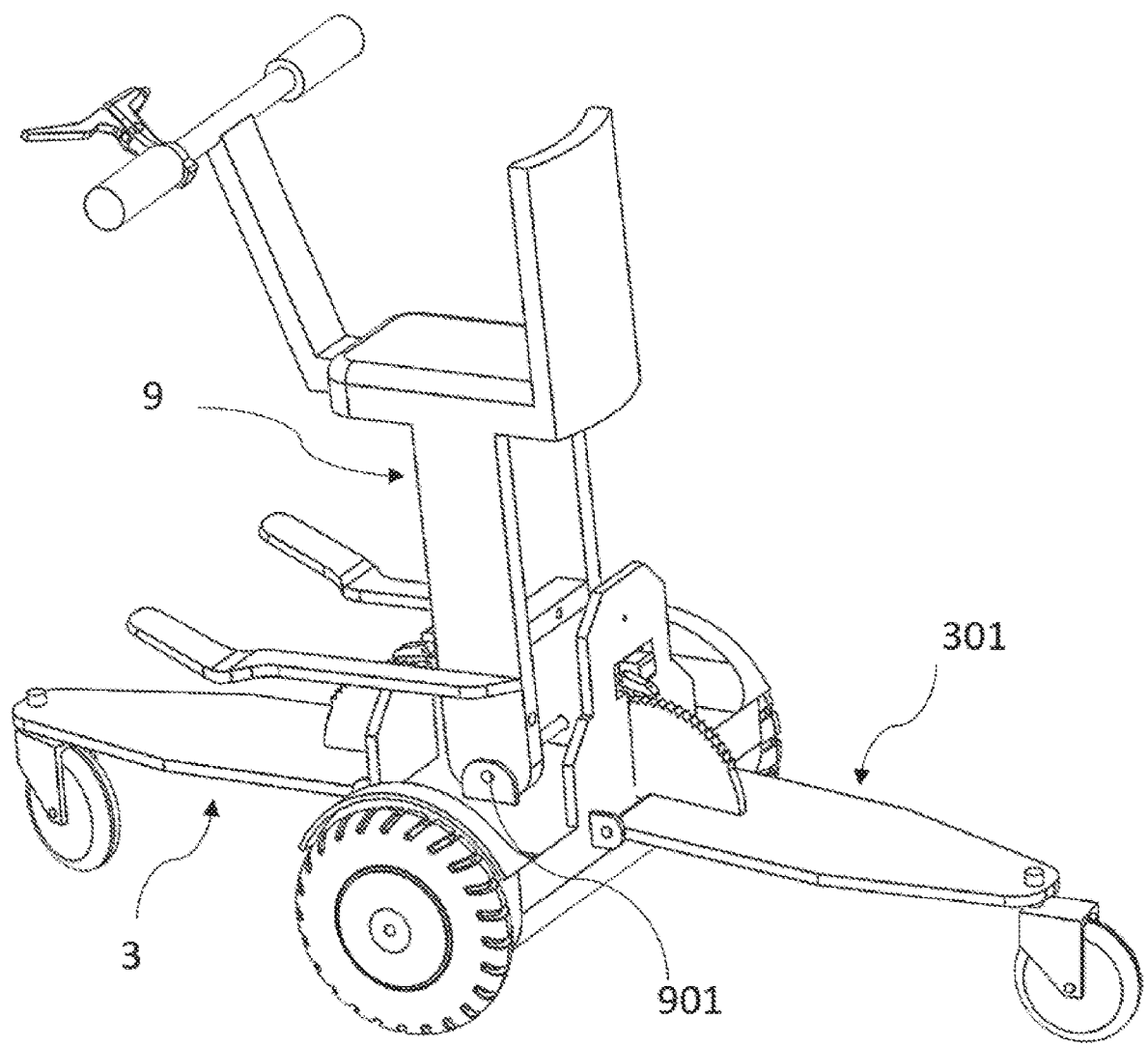
FIG. 6 is a schematic diagram of a two-wheeled self-balancing vehicle with front and rear protection wheels and a cockpit that can rotate in front and rear directions according to Embodiment 3 of the present invention.

This embodiment is a two-wheeled self-balancing vehicle with front and rear protection wheels and a cockpit that can rotate in front and rear directions. FIG. 6 is a schematic diagram of a two-wheeled self-balancing vehicle with front and rear protection wheels and a cockpit that can rotate in front and rear directions according to this embodiment. In this embodiment, a protection wheel support 301 at a rear side is introduced, and has the advantages of better preventing the vehicle from tumbling backward and accelerating the speedup process, but has the disadvantage that the longitudinal scale and the vehicle complexity are increased. The cockpit 9 of this embodiment is connected to the chassis structure 1 by using the shaft 901, so that the cockpit 9 can move the gravity center by means of front-rear rotation of the rotation shaft 901 of the cockpit. A power device driven by a control circuit is also disposed between the chassis structure 1 and the cockpit 9 to change the gravity center of the cockpit 9 and is not drawn in the drawings.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A safe two-wheeled self-balancing vehicle comprising:
   two power wheels;
   a motion sensor;
   a control circuit;
   a chassis structure;
   a direction control input device; and
   a power source;
   wherein the two power wheels are installed at two sides of the chassis structure, the motion sensor is connected to the control circuit and fixed to the chassis structure opposite thereto, the direction control input device is connected to the control circuit, and the control circuit drives the two power wheels;
   wherein a protection wheel support is disposed at a front side of the chassis structure, or both the front side and a rear side of the chassis structure; a floating protection wheel is installed at a front end of the protection wheel support;
   wherein the floating protection wheel support is connected with the chassis structure or a structure of the protection wheel support and enables the floating protection wheel to move freely in a vertical direction with respect to the chassis structure;
   wherein a locking device is connected to the chassis structure and the protection wheel support, and when the locking device is in a locked state, the floating protection wheel is in a location where the floating protection wheel is fixed to the chassis structure, and when the locking device is released, the floating protection wheel moves freely in an up-down direction;
   wherein locking and release of the locking device are controlled by an electrically controlled execution mechanism connected to and controlled by the control circuit.

2. The two-wheeled self-balancing vehicle according to claim 1, further comprising a mechanical brake control device connected with the locking device by a mechanical connection mechanism to control locking and release of the locking device.

3. The two-wheeled self-balancing vehicle according to claim 1, further comprising a cockpit slidably or rotatably installed on the chassis structure in front and rear directions, wherein a motor-driven mechanism is provided between the cockpit and the chassis structure to control front and rear sliding or rotation of the cockpit, so as to change front and rear locations of a gravity center thereof, and the motor is driven by the control circuit; and further comprising a speed control input device and a brake control input device both connected to the control circuit.

4. The two-wheeled self-balancing vehicle according to claim 3, wherein the floating protection wheel is connected to a direction steering engine, the control circuit controls a direction of the floating protection wheel by using the direction steering engine, so that a rolling direction of the floating protection wheel is consistent with an actual movement direction thereof.

5. The two-wheeled self-balancing vehicle according to claim 3, wherein a braking process comprises: locking a front protection wheel support, and then moving a gravity center of the cockpit backwards.

6. The two-wheeled self-balancing vehicle according to claim 3, wherein a start process comprises: keeping a posture for acceleration, and after a particular speed is reached, the gravity center of the cockpit moves backwards until a supporting force of the protection wheel support at the front side for the chassis structure is approximately zero, the locking device is released to enable the protection wheel into a free floating state, and self-balancing control is synchronously started.

7. The two-wheeled self-balancing vehicle according to claim 3, wherein a speed pedal and a brake pedal are disposed at a bottom of the cockpit, and state signals of the speed pedal and the brake pedal are connected to the control circuit.

8. The two-wheeled self-balancing vehicle according to claim 3, wherein a speed pedal is disposed at a bottom of the cockpit, a brake pedal is disposed on the chassis structure, and state signals of the speed pedal and the brake pedal are connected to the control circuit.

9. The two-wheeled self-balancing vehicle according to claim 3, wherein a sensor is installed at a location of the protection wheel support, the locking device, or the chassis structure, and the sensor detect a magnitude of the supporting force of the protection wheel support for the chassis structure or detect appearance and disappearance of the supporting force.

* * * * *